US009285232B2

(12) United States Patent
Dong et al.

(10) Patent No.: US 9,285,232 B2
(45) Date of Patent: Mar. 15, 2016

(54) DETERMINING A PATROL PATH

(71) Applicant: International Business Machines Corporation, Armonk, NY (US)

(72) Inventors: Wei Shan Dong, Beijing (CN); Ning Duan, Shanghai (CN); Ronald Fellows, Cheshire (GB); Li Li, Beijing (CN); Wei Sun, Beijing (CN); Zhi Hu Wang, Beijing (CN); Chang Jin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/895,627

(22) Filed: May 16, 2013

(65) Prior Publication Data
US 2013/0325336 A1 Dec. 5, 2013

(30) Foreign Application Priority Data

May 30, 2012 (CN) .......................... 2012 1 0174425

(51) Int. Cl.
*G01C 21/34* (2006.01)
(52) U.S. Cl.
CPC ........ *G01C 21/3453* (2013.01); *G01C 21/3461* (2013.01)
(58) Field of Classification Search
CPC ............... G01C 21/34; G01C 21/3415; G01C 21/3492; G01C 21/3691
USPC ............. 701/25, 26, 209, 210, 411, 533, 201, 701/202; 700/250, 253
See application file for complete search history.

(56) References Cited

U.S. PATENT DOCUMENTS

| | | | |
|---|---|---|---|
| 6,192,312 B1 * | 2/2001 | Hummelsheim | G01C 21/30 340/988 |
| 6,408,304 B1 | 6/2002 | Kumhyr | |
| 7,202,776 B2 | 4/2007 | Breed | |
| 7,532,109 B2 * | 5/2009 | Takahama | G01S 17/023 340/435 |
| 8,112,100 B2 | 2/2012 | Frank et al. | |
| 8,385,946 B2 * | 2/2013 | Forstall | G01C 21/26 340/994 |
| 2002/0191388 A1 | 12/2002 | Matveev | |
| 2003/0081127 A1 | 5/2003 | Kirmuss | |
| 2005/0280555 A1 | 12/2005 | Warner, IV | |
| 2008/0036778 A1 * | 2/2008 | Sheha | G01C 21/20 345/502 |
| 2009/0043440 A1 * | 2/2009 | Matsukawa | G05D 1/0214 701/25 |
| 2009/0171577 A1 * | 7/2009 | Roumeliotis | G01C 21/3415 701/533 |
| 2009/0192705 A1 * | 7/2009 | Golding | G01C 21/3484 701/533 |
| 2010/0235033 A1 * | 9/2010 | Yamamoto | G05D 1/024 701/26 |
| 2011/0087426 A1 * | 4/2011 | Feng | G01C 21/343 701/532 |
| 2012/0271542 A1 * | 10/2012 | Arcot | G01C 21/3492 701/411 |
| 2013/0262222 A1 * | 10/2013 | Gibson | G06Q 10/025 705/14.49 |
| 2013/0325338 A1 * | 12/2013 | Dong | G01C 21/3453 701/527 |

OTHER PUBLICATIONS

Andre Sutanto, "Optimal Police Patrol," UROP—Undergraduate Research Opportunities Program, Jun. 6-Aug. 10, 2011, pp. 1-17.

* cited by examiner

*Primary Examiner* — Thomas G Black
*Assistant Examiner* — Sara Lewandroski
(74) *Attorney, Agent, or Firm* — Cantor Colburn LLP

(57) ABSTRACT

A method of determining a path comprises obtaining a path in a road net, the road net comprising a plurality of nodes; calculating, with a processing device, an event displacement probability within coverage of the path, wherein the event displacement probability is used to describe a possibility of displacement of an event that could have occurred within the coverage of the path, to outside the coverage of the path to occur; and changing the path based on the event displacement probability.

9 Claims, 3 Drawing Sheets

DETERMINING A PATROL PATH

PRIORITY

This application claims the priority to Chinese Patent Application No. 201210174425.5, filed 30 May 2012, and all the benefits accruing therefrom under 35 U.S.C. §119, the contents of which in its entirety are herein incorporated by reference.

BACKGROUND

The present invention relates to path planning field, and more specifically, to a method and apparatus for determining a path and a method and apparatus for indicating a patrol path.

In reality, a number of events may occur that are adverse to daily life management and security and are referred to as "adverse events" herein. For example, events against the law or other provisions may be regarded as adverse events. To prevent occurrence of these adverse events, daily patrol of the police or city management officers plays a role as a beneficial means.

To more effectively utilize city resources and better prevent occurrence of adverse events, planning of patrol paths becomes a focus of study at present.

A scheme of a random patrol path is proposed in the prior art. Such a scheme does not limit patrol paths of the police or city management officers, and the police or city management officers may patrol based on their own willingness and experiences within their own dominative areas.

A scheme of hot spot patrol is further proposed in the prior art. In this scheme, some spots where adverse events occurs frequently are obtained based on historical data, and information of these spots is provided to the police or city management officers so that they can patrol on these spots where adverse events occurs frequently. Compared with the scheme of a random patrol path, this scheme improves the utilization of city resources to a certain extent.

SUMMARY

In one embodiment, a method of determining a path comprises obtaining a path in a road net, the road net comprising a plurality of nodes; calculating, with a processing device, an event displacement probability within coverage of the path, wherein the event displacement probability is used to describe a possibility of displacement of an event that could have occurred within the coverage of the path, to outside the coverage of the path to occur; and changing the path based on the event displacement probability.

In another embodiment, an apparatus for determining a path includes a first path module configured to obtain a path in a road net, the road net comprising a plurality of nodes; a processor-implemented probability calculating module configured to calculate an event displacement probability within coverage of the path obtained by the first path module, wherein the event displacement probability is used to describe a possibility of displacement of an event that could have occurred within the coverage of the path, to outside the coverage of the path to occur; and a second path module configured to change the path based on the event displacement probability.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
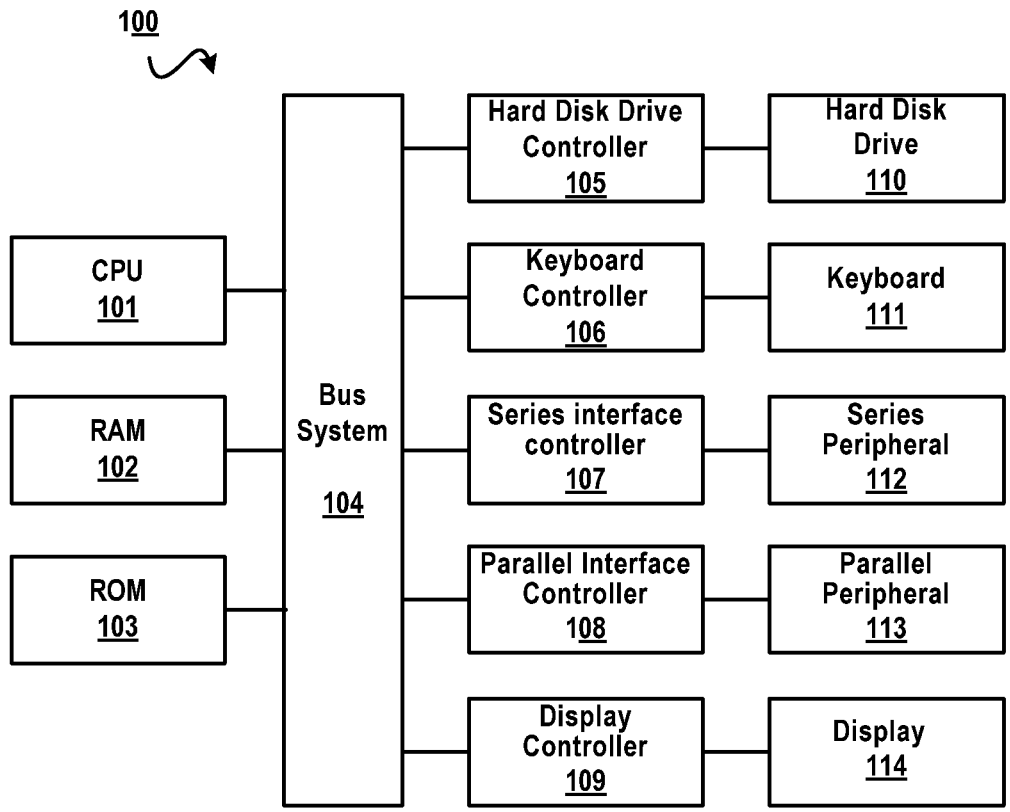
FIG. 1 shows a block diagram of an exemplary computer system which is applicable to implement the embodiments of the present invention.

To optimize a path, the present invention provides a method and apparatus for determining a path and a method and apparatus for indicating a patrol path.

According to one embodiment of the present invention, there is provided a method for determining a path, the method comprising: obtaining a path in a road net, the road net comprising a plurality of nodes; calculating an event displacement probability within coverage of by the path, wherein the event displacement probability is used to describe a possibility of displacement of an event that could have occurred within the coverage of the path, to outside the coverage of the path to occur; changing the path based on the event displacement probability.

According to another embodiment of the present invention, there is provided a method for indicating a patrol path, the method comprising: receiving a request which comprises information indicating a start point of the patrol path; obtaining a path changed based on an event displacement probability according to the above method for determining a path in the present invention, wherein the path changed based on an event displacement probability takes the indicated start point of the patrol path as a start point; sending an indication of a patrol path based on the path changed based on the event displacement probability.

According to another embodiment of the present invention, there is provided an apparatus for determining a path, the apparatus comprising: a first path module configured to obtain a path in a road net, the road net comprising a plurality of nodes; a probability calculating module configured to calculate an event displacement probability within coverage of the path obtained by the first path module, wherein the event displacement probability is used to describe a possibility of displacement of an event that could have occurred within the coverage of the path, to outside the coverage of the path to occur; a second path module configured to change the path based on the event displacement probability.

According to another embodiment of the present invention, there is provided an apparatus for indicating a patrol path, the apparatus comprising: a receiving device configured to receive a request which comprises information indicating a start point of the patrol path; a path device configured to comprise an apparatus for determining a path according to the present invention, wherein the path changed based on an event displacement probability and obtained by the apparatus for determining a path takes the indicated start point of the patrol path as a start point; a sending device configured to send an indication of a patrol path based on the path changed based on the event displacement probability.

Technical solutions provided by the present invention may optimize paths so as to further effectively utilize resources.

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 shows a block diagram of an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figures 2, 3:
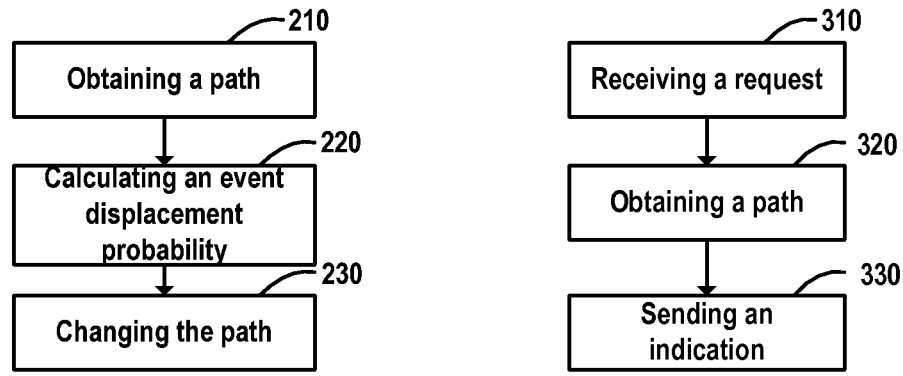
FIG. 2 shows a schematic flow chart of a method for determining a path provided in embodiments of the present invention.
FIG. 3 shows a schematic flow chart of a method for indicating a patrol path provided in embodiments of the present invention.

Reference now is made to FIG. 2, which shows a method for determining a path provided in embodiments of the present invention. The method comprises the following blocks. Block 210: obtaining a path in a road net; Block 220: calculating an event displacement probability within coverage of the path; Block 230: changing the path based on the event displacement probability.

In this embodiment, the event displacement probability is used to describe a possibility of displacement (i.e., relocation) of an event occurring within the coverage of the path, to occur outside the coverage of the path.

In this embodiment, Block 210 can be implemented by any path planning technology in the prior art. The road net in this embodiment comprises several nodes; connection lines between nodes represent actual roads, and the nodes, for example, are crossroads or landmarks or defined according to other methods. In the road net, there is a connection line between adjacent nodes and there is no other node on the connection line. Optionally, to be more beneficial to patrol path planning, connection lines between nodes may represent roads actually applicable to patrol, and it may be a minimum patrol unit between adjacent nodes in the road net. The minimum patrol unit is the minimum inseparable unit in the patrol path, for example, a section in the patrol path where no turn or u-turn is allowed.

It is believed that the hot spot patrol scheme in the prior art ignores the occurrence of adverse events in other areas when focusing city management resources on the areas where adverse events occur frequently. More importantly, if an adverse event maker has been familiar with the patrol hot spots of the police or the city management officers, he/she will be tending to make adverse events in other non-hot spot areas to avoid the patrol so that the patrol cannot achieve the expected effect; city management resources are wasted and meanwhile it is impossible to further prevent the occurrence of adverse events. Based on the above finding, embodiments of the present invention provide a technical solution that considers an event displacement in the patrol path planning. Specifically, embodiments of the present invention provide a concept of coverage of a path, and a possibility of displacement of an event, from inside of the coverage of the path to outside of the range, thereby considering the possibility for an event displacement caused by the patrol path and further optimizing the patrol path, i.e. the occurrence of adverse events may be further prevented and the resources can be utilized more fully.

The method provided in embodiments of the present invention may be used for calculating various patrol paths for, for example, the police, city management officers or other scenes that need a patrol. To facilitate the description, police patrol is always taken as an example in the following description.

In another embodiment, Block 220, for example, may perform a calculation by a change in the event occurring probability within a period.

In this embodiment and the respective embodiments below, points are not necessarily on roads, and are not necessarily end points, start points, etc. of the roads, and they can be any points in the road net. In the road net, the distance between a node and a point may be a straight-line distance or a path distance. The straight-line distance does not take into account roads, no matter the existence, length, direction, etc of the roads, and it just connects the node and the point by a straight line to form a line segment, the length of which is just the straight-line distance. However, the path distance needs to take roads into account, and it is the length of a road connecting the node and the point, i.e., the length for progressing along a road in the road net, and here the point is required to be on the road. The same applies to the straight-line distance or path distance between nodes and between points.

Many methods exist for defining the coverage of a path. The coverage of a path may be a range reachable by eyesight when one is progressing along the path. Such a definition method may consider that when a police officer patrols along the path, a person intending to carry out an adverse event will see the police officer and then will give up his intention to carry out an adverse event within the range reachable by the police officer's eyesight. For the range reachable by eyesight, objects may cause a block, or the direction of the road in eyesight and whether there is a turn, etc. may change the range reachable by eyesight.

The coverage of the path may be a range reachable by sound produced when one is progressing along the path. Such a definition method may consider that when a police officer patrols along the path, a person intending to carry out an adverse event will hear sounds from siren, etc., and then will give up his intention to carry out an adverse event within the area. For the range reachable by sound, the sounds with different magnitudes or frequencies will have different ranges.

The coverage of the path may be a maximum range enclosed by all points having a straight-line distance A with each node in the path. Taking a path being a straight line segment as an example, the start point of the path is node 1; the end point is node 2; nodes 3, 4, 5 are also on the path. Respectively taking nodes 1-5 as a center and A as a radius to get 5 circles, and the maximum coverage of the 5 circles is the coverage of the path. If the nodes on the path are quite concentrated, then the maximum range coved by the 5 circles is substantially an oval having nodes 1 and 2 as left and right focuses respectively. In this embodiment, the value range of A is, for example, 50 m-500 m. Those skilled in the art would understand that for different areas, with differences in the concentration degrees of buildings and the crowdedness degrees of roads, the values of A may also be different and may exceed the given exemplary range.

The coverage of the path may be the maximum range enclosed by all points having a path distance B with each node in the path. In this embodiment, the values of B may be different based on the difference in road conditions of areas.

In another embodiment, the coverage of the path may be any combination of the above four ranges, for example, the coverage of the first segment of the path is a range defined in the first manner, and the coverage of the second segment of the path is a range defined in the second manner.

To better measure a possibility of displacement of an event, from the coverage of the path, an extended area may be set. If the extended area includes the coverage of the path, then it is larger than and completely covers the coverage of the path. If the extended area does not include the coverage of the path, it surrounds the coverage of the path. The extended area may be a maximum range enclosed by all points having a straight-line distance C with borders of the coverage of the path. The value range of C is, for example, 5-10 km. The extended area may be a maximum range enclosed by all points having a path distance D with borders of the coverage of the path. When a path distance is used to define the extended area, D may be a determined value such as 5-10 km, or it may be a distance for progressing along the path for 0.3 hour. The extended area may be a part which is the maximum range enclosed by all points having a straight-line distance C with borders of the coverage of the path subtracted by the coverage of the path. The extended area may be a part which is the maximum range enclosed by all points having a path distance D with borders of the coverage of the path subtracted by the coverage of the path. To facilitate the description, the extended area including the coverage of the path is taken as an example for description below.

In the case that the extended area is defined, the event displacement probability is used to describe a possibility of displacement of an event that could have occurred within the coverage of the path, to an extended area and occur outside the coverage of the path. Block 220 specifically, for example, is to calculate an event displacement probability within coverage of the path based on historical data of an event occurring probability within the coverage of the path during a period, and historical data of an event occurring probability within the extended area during the same period. For example, length in this period, for example, is the length of time for progressing from the start point to the end point along the path. Those skilled in the art would understand that the length of a period may be defined by other methods, such as a certain time length, etc. In another embodiment, Block 220, for example, is to obtain the event occurrence density based on the event occurring probability, and to calculate the event displacement probability by using the event occurrence densities within the coverage of the path and within the extended area.

The event displacement probability obtained by calculation may reflect the possibility for event displacement caused by patrolling along the path. In one embodiment, the event displacement probability may be calculated by $WDQ=|Mt1-Mt0|/|Nt1-Nt0|$, wherein WDQ is the event displacement probability; $Mt1$ and $Mt0$ are respectively event occurring probabilities in the extended area at $t1$ and $t0$ moments; $Nt1$ and $Nt0$ are respectively event occurring probabilities in the coverage of the path at $t1$ and $t0$ moments. To obtain an event occurring probability in a certain area or range at a moment, data within a short time before and after the moment may be taken for calculation. The event occurring probability, for example, may be the number of events occurring per unit time, or the number of events occurring per unit time and per unit area. Those skilled in the art would understand that the above formula for calculating the event displacement probability may have other variant, for example, adding constants or making inverse ratio, etc., or $Mt1$ and $Mt0$ are respectively event occurring probabilities within the extended area and outside the coverage of the path at $t1$ and $t0$ moments. In this embodiment, as described above, the difference between $t0$ and $t1$, for example, is the length of time needed for progressing along the path. By employing the historical data of the extended area and the historical data within the coverage of the path, event displacement condition can be reflected accurately, better patrol paths can be obtained, and resource can be utilized more effectively.

Since the above method for calculating the event displacement probability involves historical data within a period, in order to eliminate interferences from other factors within the period, a reference area can be set which is located outside the extended area. Optionally, the reference area is located adjacent to the extended area or is with a situation similar to the coverage of the extended area/path. During specific calculations, the historical data of the reference area in the same period can be used as a basis. With $WDQ=|Mt1-Mt0|/|Nt1-Nt0|$ still taken as an example for explanation, when using the historical data of the reference area in the same period as the basis, the calculating method is adjusted to $WDQ=|Mt1/Tt1-Mt0/Tt0|/|Nt1/Tt1-Nt0/Tt0|$, wherein $Tt1$ and $Tt0$ are respectively event occurring probabilities within the reference area at $t1$ and $t0$ moments. Using the event occurring probability within the reference area as the basis can eliminate interferences from other factors to the maximum extent, can more accurately reflect the influence of a patrol path on the event occurrence within the coverage of the path, and can better plan the patrol path.

The method for determining a path provided in this embodiment may further comprise calculating event occurring probabilities between adjacent nodes in the road net. Correspondingly, Block 230 is to change, based on the event displacement probability, an event occurring probability between at least one node within the extended area and nodes adjacent to the at least one node, and to obtain a new path based on the changed event occurring probability. The adjacent nodes of the node are also within the extended area. When changing, based on the event displacement probability, an event occurring probability between a node and its adjacent nodes, the event displacement probability can be used for calculation, or the event displacement probability can be used to compare with a threshold, where the difference between the event occurring probabilities can be reduced by increasing or decreasing the event occurring probabilities between at least one node within the extended area and the nodes adjacent to the at least one node when the event displacement probability is greater than the threshold, or different event displacement probabilities correspond to different changing schemes for event occurring probabilities between a node within the extended area and its adjacent nodes. In this embodiment and other respective embodiments, when changing respective parameters of nodes, nodes can be selected from the coverage of the path or from the path, which will not be illustrated in detailed thereafter for brevity. To facilitate the description, selecting nodes from the coverage of the path is taken as an example for description below.

In this embodiment and other respective embodiments, the methods for obtaining paths based on the event occurring probabilities in Block 210 and Block 230 can be the same or be different. Block 210 can be obtaining a path based on an event occurring probability. The specifically obtained path can be calculating event occurring probabilities of the entire path, that is, adding the event occurring probabilities between each two adjacent nodes on the path, and taking the path having the highest event occurring probability as the finally obtained path.

In another embodiment, the method for determining a path may comprise: obtaining X paths in the road net, an end node of every path being a node whose path distance from a start node is closest to E, and E being a set distance; calculating event occurring probabilities between adjacent nodes in the road net; obtaining Y paths having the highest event occurring probability in the X paths based on the event occurring probabilities between adjacent nodes in the road net; calculating a probability for a node to be present on the Y paths. Obtaining X paths in the road net, for example, is to randomly generate X paths, and of course other path planning methods may also be employed to generate X paths, or X paths are directly specified. Since the point having a path distance E from a start node in the road net is not necessarily a node, in order to enable both the start point and end point of the path to be nodes in the road net, the end node of the path is taken as a node whose path distance from the start node is closest to E. Likewise, the event occurring probability on a path can be obtained by calculating the event occurring probabilities between adjacent nodes, and thereby Y paths having the highest event occurring probability can be obtained. Y, for example, is about 30% of X. When calculating the probability for a node to be present on the Y paths, the calculation may, for example, be carried out by employing the number of times for a patrol path to pass by a node within a period in historical data and the number of times for the patrol path passing by the node within the period to belong to the Y paths. If taking it into account that certain node has been covered by the patrol path for multiple times, the probability for the node to be present on the Y paths can be correspondingly reduced so that the possibility for the patrol path to pass by the point again can be reduced to enable resources to be utilized fully. Correspondingly, Block 230 can be implemented as changing, based on the event displacement probability, a probability for at least one node within the coverage of the path to be present on the Y paths, and obtaining a new path based on the changed probability for the at least node to be present on the Y paths. Block 210, for example, is to generate a path based on the probability for the node to be present on the Y paths. The methods for obtaining paths based on the probabilities for nodes to be present on the Y paths in Block 210 and Block 230 can be the same or be different.

In another embodiment, the method for determining a path, for example, may comprise: obtaining P paths in the road net, an end node of every path being a node whose path distance from a start node is closest to F, and F being a set distance; calculating event occurring probabilities between adjacent nodes in the road net; obtaining Q paths having the highest event occurring probability in the P paths based on the event occurring probabilities between adjacent nodes in the road net; calculating a probability for a node to be present on the Q paths; generating a transformation matrix based on a probability for a node to be present on the Q paths, wherein if a first node is adjacent to a second node, at least one value corresponding to the second node in the transformation matrix is a ratio of the probability for the second node to be present on the Q paths to a sum of probabilities for each node adjacent to the first node to be present on the Q paths. Specific embodiments of some of the operations may refer to the above description. Correspondingly, Block 230 can be implemented as updating, based on the event displacement probability, at least one value corresponding to at least one node within the coverage of the path in the transformation matrix; obtaining a new path based on the updated transformation matrix. Block 210, for example, is to generate a path based on a transformation matrix. The methods for obtaining paths based on the transformation matrix in Block 210 and Block 230 can be the same or be different.

To better describe embodiments of the present invention, Blocks 210 and 230 both being obtained via the transformation matrix are taken as an example in below description. 3000 paths are randomly generated based on road net information, and the length of the path is about 10 km, that is, the end node of the paths is a node whose path distance from the start node is closest to 10 km. Event occurring probabilities between adjacent nodes in the road net are calculated, wherein the calculation block and randomly generating a path can be performed simultaneously or in sequence, and the performing sequence has no specific requirement. When calculating event occurring probabilities between adjacent nodes in the road net, all nodes, or some of the nodes, or merely the nodes covered by the randomly generated paths in the road net can be calculated. There are multiple methods for calculating the event occurring probabilities between adjacent nodes, for example, the number of events occurring in a period or the number of events having occurred per unit distance, etc., can be used. Based on the event occurring probabilities between adjacent nodes obtained by calculation, the event occurring probability for the randomly generated path can be calculated, for example, path 1 includes 3 nodes; thus, a sum of the event occurring probabilities between the first node and the second node and the event occurring probabilities between the second node and the third node is taken as the event occurring probability of the path. 1000 paths having the highest event occurring probability are selected from the randomly generated 3000 paths. The probability for a node to be present on the 1000 paths is calculated via Shi/(Nit−1×Si), wherein Shi is the number of times for a patrol path passing by node i within time t to belong to the 1000 paths; Si is the number of times for a patrol path to pass by node i within time t; Nit−1 is the number of times for a patrol path to pass by node i within time t−1. Transformation matrix 1 is generated based on the probability obtained by calculation, wherein the transformation matrix 1 is shown as Table 1 below.

TABLE 1

| Transformation Matrix 1 | | | | | |
|---|---|---|---|---|---|
| | $n_1$ | $n_2$ | $n_3$ | ... | $n_g$ |
| $n_1$ | 0 | 1 | 0.5 | ... | 0.3 |
| $n_2$ | 0.4 | 0 | 0.5 | ... | 0.3 |
| $n_3$ | 0.4 | 1 | 0 | ... | 0.3 |
| ... | ... | ... | ... | ... | ... |
| $n_g$ | 0.4 | 1 | 0.5 | ... | 0 |

In the transformation matrix 1 as shown in Table 1, if the first node is not adjacent to the second node, the value of the cross point of the first node and the second node is 0; if the first node is adjacent to the second node, at least one value corresponding to the second node is the probability for the second node to be present on the 1000 paths. The value of some point in the matrix is $G_{ij}=H_j \times I_{ij}$, wherein $H_j$ is the probability for the node j to be present on the 1000 paths; the value of $I_{ij}$ is 1 when the node i and the node j are adjacent nodes and it is 0 when the node i and the node j are not adjacent nodes.

Optionally, when the transformation matrix 1 is calculated, the probabilities for nodes to be present on the 1000 paths can be normalized, that is, if the first node is adjacent to the second node, at least one value corresponding to the second node in the transformation matrix 1 is the ratio of the probability for the second node to be present on the 1000 paths to a sum of probabilities for each node adjacent to the first node to be present on the paths. If a normalized calculation manner is employed, a generated transformation matrix 2 is shown as Table 2. In the transformation matrix 2 as shown in Table 2, the calculation method, for example, is $Gij=(Hj \times Iij)/\Sigma Hw \times Iiw$, wherein the range of the value of w is from 1 to g. It can be seen that a sum of numerical values in each row in the transformation matrix 2 is 1.

TABLE 2

| Transformation matrix 2 | | | | | |
|---|---|---|---|---|---|
| | $n_1$ | $n_2$ | $n_3$ | ... | $n_g$ |
| $n_1$ | 0 | 0.55 | 0.28 | ... | 0.17 |
| $n_2$ | 0.33 | 0 | 0.42 | ... | 0.25 |
| $n_3$ | 0.23 | 0.59 | 0 | ... | 0.18 |
| ... | ... | ... | ... | ... | ... |
| $n_g$ | 0.21 | 0.53 | 0.26 | ... | 0 |

To facilitate the description, the transformation matrix 2 is taken as an example to further describe Block 210 and Block 230. In Block 210, an exemplary path can be obtained based on the obtained transformation matrix 2, and the exemplary path will generally extend toward the direction of a bigger value in the matrix. It is known to those skilled in the art that in the prior art, given a transformation matrix, there are multiple methods for generating an exemplary path. Only one example is taken here for explanation. It can be seen from the transformation matrix 2 that there will be a higher event occurring probability from node $n_1$ to node $n_2$, and there will be a higher event occurring probability from node $n_2$ to node $n_3$, and thus an exemplary path may be from $n_1$ to $n_2$ and then to $n_3$.

In Block 230, if the event displacement probability is smaller than the first threshold, the transformation matrix 2 remains unchanged. In that case, the path generated based on the transformation matrix is still the original path. In response to the event displacement probability being smaller than the first threshold, the path generated in Block 210 is directly taken as the final path. If the event displacement probability is greater than the first threshold and smaller than the second threshold, the values in the transformation matrix 2 are changed to reduce the difference between the values corresponding to the nodes within the area covered by the path in the transformation matrix 2. For example, the difference between the values corresponding to the nodes within the area covered by the path in the transformation matrix 2 can be reduced by data smoothing. For example, if n1 is in the area covered by the path, all values in the first row of the transformation matrix 2 are sorted, and if m values are not 0, starting from the maximum value, passing an amount to its adjacent values in turn, and the amount, for example, is one m-th of the difference between two adjacent values. If n1 is adjacent to only n2, n3 and ng, there are 3 values in total that are not 0 in the first line of the transformation matrix 2, and m=3. After sorting, the maximum value is 0.55, which is followed by 0.28 and 0.17 in turn. The difference between the maximum value and its adjacent value is 0.27, and one third of 0.27 is 0.09, and then the amount passed by the maximum value 0.55 to its adjacent value 0.28 is 0.09. 0.55 minus 0.09 is 0.46, and 0.28 plus 0.09 is 0.37. 0.37 and 0.17 are adjacent and have a difference of 0.2, then the amount passed by 0.37 to 0.17 is 0.07, and correspondingly 0.37 minus 0.07 is 0.3 while 0.17 plus 0.07 is 0.24. Three values after being changed are respectively 0.46, 0.3 and 0.24, and it can be seen clearly that the difference among the three values is reduced. If the event displacement probability is greater than the second threshold, the difference between the values in the transformation matrix 2 corresponding to the nodes within the coverage of the path is eliminated to obtain a random path. Those skilled in the art would understand that there are other methods for updating the transformation matrix based on the event displacement probability.

It can be seen that the event displacement can be taken into account in the path planning in this embodiment by changing the factors based on which the path is calculated. In areas where event displacement more serious, more modification are made to the factors based on which the path is calculated so that the obtained final path would deviate from the exemplary path originally planned, while in the area where event displacement less serious, fewer modifications are made to the factors based on which the path is calculated so that the obtained final path would be substantially the same as the exemplary path originally planned. This just meets the requirement for patrol. In some areas, since a police officer's patrol will cause adverse events to be relocated to the outside of the areas, it is necessary to change the original patrol path because progressing in accordance with the original patrol path not only cannot prevent adverse events in time but also will waste the police force. However, in some other areas, a police officer's patrol substantially will not cause adverse events to be relocated to the outside of the areas because, for example, the outside of the areas are too barren to carry out adverse events, etc., and thus the police officer still can progress in accordance with the original exemplary patrol path so as to prevent adverse events as many as possible and to utilize the city management resources to the maximum extent.

As shown in FIG. 3, embodiments of the present invention further provide a method for indicating a patrol path. The method comprises: Block 310: receiving a request which comprises information indicating a start point of the patrol path; Block 320: obtaining a patrol path taking the indicated start point of the patrol path as a start point; Block 330: sending an indication of a patrol path based on the patrol path.

In this embodiment, Block 320 may employ the method for determining a path provided by the embodiment as shown in FIG. 2. Specifically, as a request comprising information indicating a start point of the patrol path is received in Block 310, in the embodiment as shown in FIG. 2, when a path in the road net is obtained, the path takes the start point indicated in the request as a start point and does not change the start point when changing the path. In the embodiment, the request received in Block 310 may comprise information indicating the path length, and correspondingly Block 320 obtains a patrol path taking the indicated start point as a start point and the indicated length as a length. In this embodiment, the request received in Block 310 may comprise information indicating a direction of a path, and correspondingly Block 320 obtains a patrol path taking the indicated start point as a start point and along the indicated direction. Those skilled in the art would understand that the request received in Block 310 may comprise information indicating any combination of the start point, the length and the direction, and correspondingly in Block 320, corresponding conditions will also be met when generating the path. Specifically, in Block 320, obtaining a path will meet a corresponding condition and after the path is changed, it will also meet a corresponding condition.

Based on the description of the embodiment as shown in FIG. 2, those skilled in the art would understand that when the request received in Block 310 comprises different indications, methods for generating a path will correspondingly be different; when there are a lot of restrictions, the resources consumed by calculation may be less and the operations for calculating may be simpler.

In this embodiment, in Block 330, when sending an indication for a patrol path, either the patrol path can be sent to the police officer at one time or the next target node can be sent to the police officer.

In this embodiment, a police officer may send a request in real time, and the method for determining a path as shown in FIG. 2 is capable of supporting such a real-time request requirement to obtain a corresponding patrol path. Thus the method for indicating a patrol path provided in this embodiment can meet the real-time requirement, dynamically plan the patrol path, take the event displacement caused by patrolling into consideration, and reflect the displacement in the modified path so as to better instruct the patrol and utilize the police force.

The method for indicating a patrol path provided in embodiments of the present invention may further have various applications. For example, a request sent by a police officer only comprises the start point of the patrol path, and the method may obtain patrol paths in multiple directions. Since event displacements in multiple directions will be different, their influences on patrol paths will also be different. When indicating a patrol path to the police officer, all patrol paths modified due to the influences of event displacements in multiple directions can be sent to the police officer so that the police officer himself can select the patrol path. Thus, the method for indication a patrol path provided in this embodiment further has the advantages of easy application and flexible extension.

Figure 4:
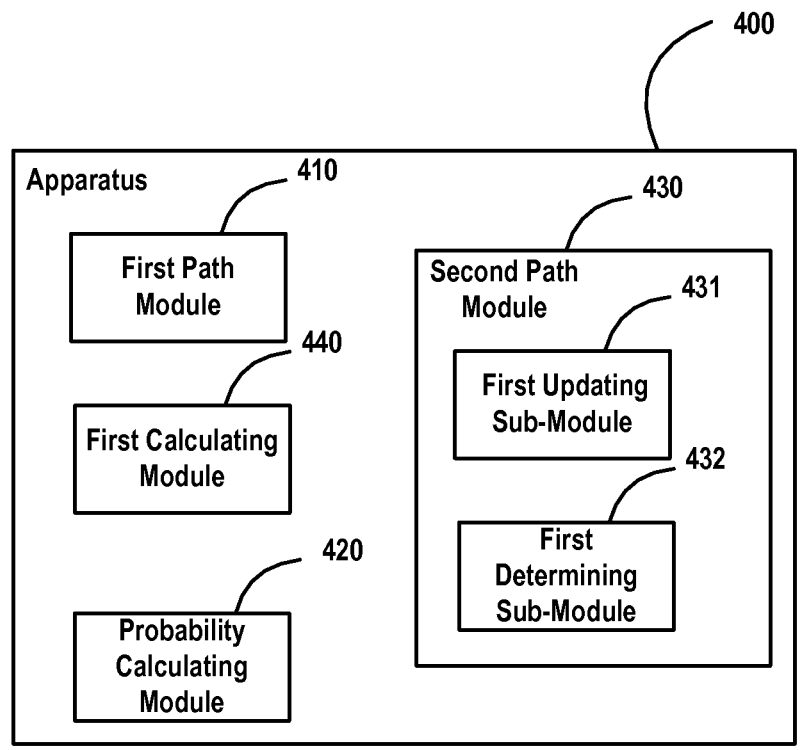
FIG. 4 shows a structural schematic diagram of an apparatus for determining a path provided in embodiments of the present invention.

Reference now is made to FIG. 4, which shows an apparatus 400 for determining a path provided in embodiments of the present invention. The apparatus 400 comprises the following modules: a first path module 410 configured to obtain a path in a road net; a probability calculating module 420 configured to calculate an event displacement probability within coverage of the path obtained by the first path module 410; a second path module 430 configured to change the path based on the event displacement probability.

According to this embodiment, influence brought by patrolling to the displacement of adverse events may be taken into account so as to better plan the patrol path, and also to save resources when better preventing the occurrence of adverse events.

In this embodiment, the coverage of the path, the event displacement probability, and the extended area, etc., which may all refer to the embodiment as shown in FIG. 2, are not illustrated in detail here for brevity. The first path module 410 may be implemented by employing any known path planning technology. The probability calculating module 420, for example, can be calculated by the change in event occurring probability within a period.

Specifically, in this embodiment, the apparatus 400, for example, may comprise a range determining module. The range determining module is configured to determine coverage of the path obtained by the first path module 410. The range determining module, for example, may comprise at least one of: a first range sub-module configured to determine coverage of the path based on the range reachable by eyesight when progressing along the path; a second range sub-module configured to determine coverage of the path based on the range reachable by sound produced when progressing along the path; a third range sub-module configured to determine coverage of the path based on the maximum range enclosed by all points having a straight-line distance A with each nodes in the path; a fourth range sub-module configured to determine coverage of the path based on the maximum range enclosed by all points having a path distance B with each node in the path.

In this embodiment, the probability calculating module 420, for example, is specifically configured to calculate an event displacement probability within coverage of the path based on historical data of an event occurring probability within coverage of the path during a period, and historical data of an event occurring probability within the extended area during the same period. Event displacement condition can be reflected more accurately by employing the historical data of the extended area and the historical data within the coverage of the path so that a better patrol path can be obtained and the resources can be utilized more effectively.

In order to eliminate interferences from other factors within the period in which employed by calculation, a reference area can be set. Correspondingly, the probability calculating module 420 is specifically configured to take historical data of an area other than the extended area during the same period as a basis for the calculating; and to calculate an event displacement probability within coverage of the path based on historical data of an event occurring probability within coverage of the path during a period, and historical data of an event occurring probability within the extended area during the same period.

In another embodiment, the apparatus 400, for example, may further comprise a first calculating module 440. The first calculating module 440 is configured to calculate event occurring probabilities between adjacent nodes in the road net. Correspondingly, the second path module 430, for example, may comprise a first updating sub-module 431 and a first determining sub-module 432. The first updating sub-module 431 is configured to change, based on the event displacement probability, an event occurring probability between at least one node within the extended area and nodes adjacent to the at least one node; the first determining sub-module 432 is configured to obtain a new path based on the changed event occurring probability. Optionally, the first path module 410 is configured to obtain a path based on the event occurring probability.

Figure 5:
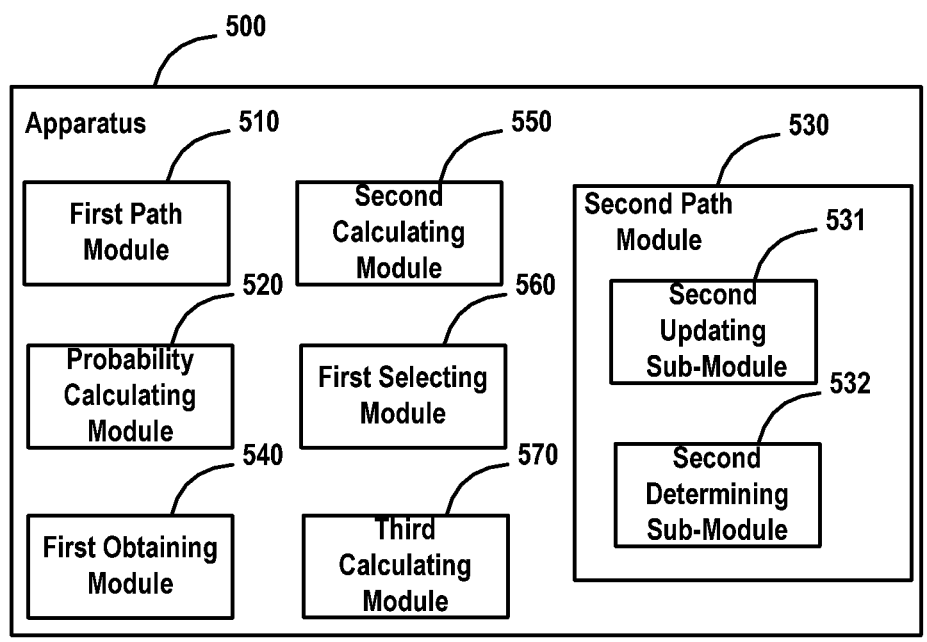
FIG. 5 shows a structural schematic diagram of another apparatus for determining a path provided in embodiments of the present invention.

As shown in FIG. 5, according to another embodiment, the apparatus 500 further comprises a first obtaining module 540, a second calculating module 550, a first selecting module 560 and a third calculating module 570 besides a first path module 510, a second path module 530 and a probability calculating module 520, wherein the first obtaining module 540 is configured to obtain X paths in the road net, an end node of each path being a node whose path distance from a start node is closest to E; the implementation of the second calculating module 550 may refer to that of the first calculating module 440; the first selecting module 560 is configured to obtain Y paths having the highest event occurring probability in the X paths based on the event occurring probabilities between adjacent nodes in the road net; the third calculating module 570 is configured to calculate a probability for a node to be present in the Y paths. Correspondingly, the second path module 530, for example, comprises a second updating sub-module 531 and a second determining sub-module 532. The second updating sub-module 531 is configured to change, based on the event displacement probability, a probability for at least one node within the extended area to be present in the Y paths; the second determining sub-module 532 is configured to obtain a new path based on the probability for the changed node to be present in the Y paths. The first path module 510 in this embodiment may refer to the first path module 410 as shown in FIG. 4, or may be configured to generate a path based on the probability for the node to be present in the Y paths.

Figure 6:
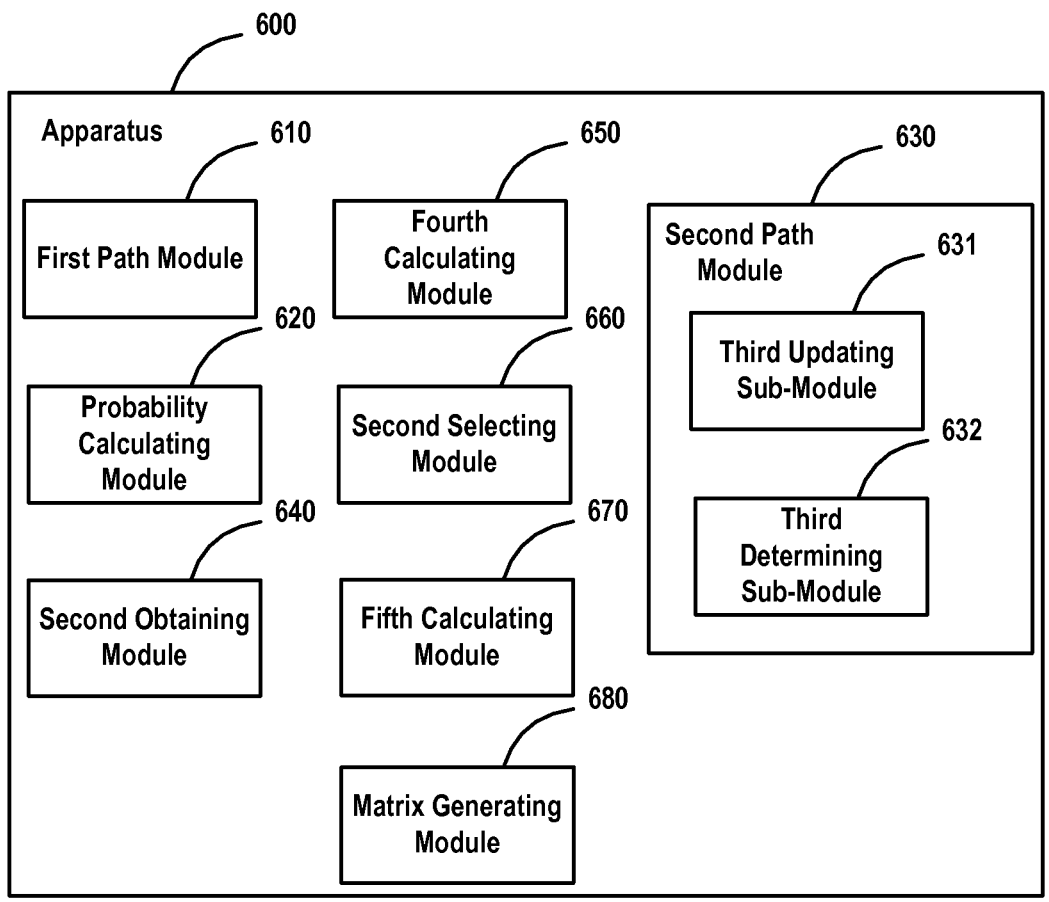
FIG. 6 shows a structural schematic diagram of a further apparatus for determining a path provided in embodiments of the present invention.

As shown in FIG. 6, according to another embodiment, the apparatus 600 further comprises a second obtaining module 640, a fourth calculating module 650, a second selecting module 660, a fifth calculating module 670 and a matrix generating module 680 besides a first path module 610, a second path module 630 and a probability calculating module 620, wherein the implementation of the second obtaining module 640 may refer to that of the first obtaining module 540; the implementation of the fourth calculating module 650 may refer to that of the first calculating module 440; the implementation of the second selecting module 660 may refer to that of the first selecting module 560; the implementation of the fifth calculating module 670 may refer to that of the third calculating module 570; the matrix generating module 680 is configured to generate a transformation matrix based on a probability for a node to be present in the Y paths. The concept and the calculation of the transformation matrix in this embodiment may refer to the method embodiment as shown in reference to FIG. 2. Correspondingly, the second path module 630 comprises a third updating sub-module 631 and a third determining sub-module 632. The third updating sub-module 631 is configured to update, based on the event displacement probability, at least one value corresponding to at least one node within the extended area in the transformation matrix; the third determining sub-module 632 is configured to obtain a new path based on the updated transformation matrix. The first path module 610 may refer to the first path module 410 as shown in FIG. 4 or the first path module 510 as shown in FIG. 5, or may be configured to generate a path based on the transformation matrix.

Details of the implementation in the apparatus embodiments as shown in FIGS. 4, 5 and 6 may refer to that of the embodiment as shown in reference to FIG. 2.

In the above apparatus embodiments, the event displacement can be taken into account to the path planning by changing the factors based on which the path is calculated. In areas where event displacement is more serious, more modification are made to the factors based on which the path is calculated so that the obtained final path would deviate from the exemplary path originally planned, while in the area where event displacement less serious, fewer modifications are made to the factors based on which the path is calculated so that the obtained final path would be substantially the same as the exemplary path originally planned. Patrolling along the patrol path obtained by the apparatus can prevent adverse events as much as possible and utilize the police force to the maximum extent.

Figure 7:
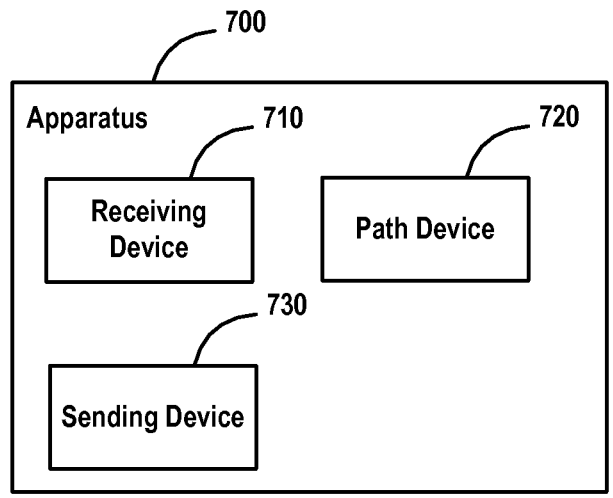
FIG. 7 shows a structural schematic diagram of an apparatus for indicating a patrol path provided in embodiments of the present invention.

As shown in FIG. 7, embodiments of the present invention provide an apparatus 700 for indicating a patrol path. The apparatus 700 comprises: a receiving device 710 configured to receive a request which comprises information indicating a start point of the patrol path; a path device 720 configured to comprise an apparatus for determining a path provided by the embodiments as shown in above FIGS. 4, 5 and 6, to obtain the path changed based on an event displacement probability, and to take the indicated start point of the patrol path as a start point; a sending device 730 configured to send an indication of a patrol path based on the obtained path changed based on the event displacement probability.

In this embodiment, the request received by the receiving device 710, for example, may comprise information indicating the direction and the start point of a patrol path. Correspondingly, the path changed based on the event displacement probability and obtained by the path device 720 takes the indicated start point of the patrol path as a start point and is along the indicated direction of the patrol path.

In this embodiment, the request received by the receiving device 710, for example, may comprise information indicating the start point and the length of a patrol path. Correspondingly, the path changed based on the event displacement probability and obtained by the path device 720 takes the indicated start point of the patrol path as a start point and has a length approximate to the indicated length.

The implementation details and more embodiments of the apparatus 700 provided in this embodiment may refer to embodiments as shown in FIGS. 2 and 3.

By the apparatus for indicating a patrol path provided by embodiments of the present invention, in case that the start point of the patrol path is known, the influence of the patrol path on the displacement of adverse events can be taken into account so as to optimize the patrol path and notify the police of the exemplary patrol path.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of determining a path for an individual to patrol, the method comprising:
   receiving, via a receiving device, a request from the individual for an initial patrol path to patrol within a road net, the road net comprising a plurality of nodes, the request including a start point of the individual within the road net;
   determining the initial patrol path using the start point, and transmitting the initial patrol path to the individual;
   calculating, with a processing device, an event displacement probability within coverage of the initial path, wherein the event displacement probability is used to determine a likelihood of a relocation of an event that occurs within the coverage of the initial patrol path, in the absence of the individual on patrol in the initial patrol path, to occur at a location outside the coverage of the initial patrol path;
   changing the initial patrol path to a modified patrol path based on the event displacement probability; and
   transmitting, via a transmitting device, the modified patrol path to the individual.

2. The method according to claim 1, wherein the coverage of the initial patrol path comprises at least one of:
   a maximum range enclosed by all points having a straight-line distance A with each node in the initial patrol path; and
   a maximum range enclosed by all points having a path distance B with each node in the initial patrol path, wherein the path distance is a length of progressing along a road in the road net.

3. The method according to claim 2, wherein the location outside the coverage of the initial patrol path comprises an extended area, wherein the extended area comprises one of:
   a maximum range enclosed by all points having a straight-line distance C with a border of the coverage of the initial patrol path;
   a maximum range enclosed by all points having a path distance D with a border of the coverage of the initial patrol path;

a part which is the maximum range enclosed by all points having a straight-line distance C with a border of the coverage of the initial patrol path subtracted by the coverage of the initial patrol path; and a part which is the maximum range enclosed by all points having a path distance D with a border of the coverage of the initial patrol path subtracted by the coverage of the initial patrol path.

4. The method according to claim 3, wherein calculating the event displacement probability within coverage of the initial patrol path is based on historical data of an event occurring probability within the coverage of the initial patrol path during a period, and historical data of an event occurring probability within the extended area during the same period.

5. The method according to claim 4, wherein the calculating an event displacement probability within coverage of the initial patrol path further comprises:

taking historical data of an area other than the extended area during the same period as a basis for the calculating.

6. The method according to claim 1, further comprising calculating event occurring probabilities between adjacent nodes in the road net, and wherein the changing the initial patrol path to a modified patrol path based on the event displacement probability comprises changing, based on the event displacement probability, an event occurring probability between at least one node within the coverage of the path and nodes adjacent to the at least one node, and obtaining the modified patrol path based on the changed event occurring probability.

7. The method according to claim 1, wherein the method further comprises:

obtaining a number, X, of paths in the road net, an end node of each of the X paths being a node whose path distance from a start node is closest to E, and E being a set distance;

calculating event occurring probabilities between adjacent nodes in the road net;

obtaining another number, Y, of paths having the highest event occurring probability in the X paths based on the event occurring probabilities between adjacent nodes in the road net;

calculating a probability for a given one of the start, end and adjacent nodes to be present on the Y paths; and the changing the initial patrol path based on the event displacement probability comprises changing, based on the event displacement probability, a probability for at least one node within the coverage of the path to be present on the Y paths, and obtaining the modified patrol path based on the changed probability for the at least one node to be present on the Y paths.

8. The method according to claim 1, wherein the method further comprises:

obtaining a number, P, paths in the road net, an end node of each of the P paths being a node whose path distance from a start node is closest to F, and F being a set distance;

calculating event occurring probabilities between adjacent nodes in the road net;

obtaining another number, Q, of paths having the highest event occurring probability in the P paths based on the event occurring probabilities between adjacent nodes in the road net;

calculating a probability for a given one of the start, end and adjacent nodes to be present on the Q paths;

generating a transformation matrix based on a probability for a node to be present on the Q paths, wherein if a first node is adjacent to a second node, at least one value corresponding to the second node in the transformation matrix is a ratio of the probability for the second node to be present on the Q paths to a sum of probabilities for each node adjacent to the first node to be present on the Q paths; and wherein the changing the initial patrol path based on the event displacement probability comprises updating, based on the event displacement probability, at least one value corresponding to at least one node within the coverage of the initial patrol path in the transformation matrix, and obtaining the modified patrol path based on the updated transformation matrix.

9. The method according to claim 1, wherein:

the request further comprises information indicating a direction of the initial patrol path; and the modified patrol path based on the event displacement probability takes the indicated start point of the patrol path as a start point and is along the indicated direction of the initial patrol path.

* * * * *